(12) United States Patent  (10) Patent No.: US 8,634,878 B2
Sarkissian et al.  (45) Date of Patent: Jan. 21, 2014

(54) USER APPLICATION INITIATED TELEPHONY

(75) Inventors: Frederick Sarkissian, San Jose, CA (US); Jeffrey Siegel, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 223 days.

(21) Appl. No.: 13/044,802

(22) Filed: Mar. 10, 2011

(65) Prior Publication Data

US 2012/0231769 A1  Sep. 13, 2012

(51) Int. Cl.
*H04M 1/00*  (2006.01)

(52) U.S. Cl.
USPC ............. 455/569.1; 455/412.2; 455/414.1; 370/277

(58) Field of Classification Search
USPC ........... 455/41.2, 412.2, 414.1, 417, 456.1, 455/456.2, 456.3, 569.1; 370/277
See application file for complete search history.

(56) References Cited

U.S. PATENT DOCUMENTS

| | | | |
|---|---|---|---|
| 6,856,817 B2 * | 2/2005 | Tischler | ............... 455/569.1 |
| 7,424,288 B2 | 9/2008 | Jung et al. | |
| 8,116,788 B2 | 2/2012 | Sarkissian et al. | |
| 8,121,547 B2 | 2/2012 | Findlay et al. | |
| 2003/0003900 A1 | 1/2003 | Goss et al. | |
| 2003/0073431 A1 | 4/2003 | Dorenbosch | |
| 2008/0112567 A1 | 5/2008 | Siegel et al. | |
| 2008/0161067 A1 | 7/2008 | Reda et al. | |
| 2008/0220813 A1 | 9/2008 | Brown et al. | |
| 2010/0263015 A1 * | 10/2010 | Pandey et al. | ............... 725/153 |
| 2011/0207447 A1 | 8/2011 | Bhow | |
| 2012/0005281 A1 | 1/2012 | Winter et al. | |
| 2012/0165026 A1 | 6/2012 | Ge et al. | |
| 2012/0195420 A1 | 8/2012 | Mahalingam | |

OTHER PUBLICATIONS

Kenneth Kannappan, Communications Network Call Initiation Transition, U.S. Appl. No. 13/081,261, filed Apr. 6, 2011.
International Search Report mailed Apr. 16, 2012, in PCT Application No. PCT/US2012/020972.

* cited by examiner

*Primary Examiner* — Tuan H Nguyen
(74) *Attorney, Agent, or Firm* — Chuang Intellectual Property Law

(57) ABSTRACT

Systems and methods for initiating telephony calls are presented. In one example, a user selection of a desired application item is received at a computing device and a dial number associated with the desired application item is transmitted from the computing device to a wireless headset. The dial number is received at the wireless headset and a call is responsively initiated by transmitting the dial number from the wireless headset to a mobile phone device.

25 Claims, 14 Drawing Sheets

USER APPLICATION INITIATED TELEPHONY

BACKGROUND OF THE INVENTION

The convergence of computers, voice communications, and the Internet has revolutionized the manner and speed by which people are able to communicate. People today have the capacity to work and collaborate using a variety of electronic devices and applications. However, as the number of devices and applications a person typically uses for collaboration has increased, so has the possibility that a person working within a given collaborative application will wish to switch modes of communication from text based to actual voice conversation. For example, a user working in an email, social software, or sales force automation (SFA) application upon reading new information about a topic, person, or event may wish to transition from consuming information or text communication to a voice call with another individual or individuals to take action related to that content or text communication.

In the prior art, the user must physically locate his phone and/or manually initiate the call provided there is an existing integration between, that application and the PBX or via peer-to-peer VoIP calling infrastructure. For many applications this simply does not exist leaving the user to manually find, pickup a phone, and initiate calling which requires the user to shift their attention away from the context and application they were working in to continue the workflow, by switching to another voice-related application or to another device altogether. This process is inconvenient, disruptive to attention focus, and time consuming in many instances. As a result, there is a need for improved methods and apparatuses for initiating telephony calls.

BRIEF DESCRIPTION OF THE. DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
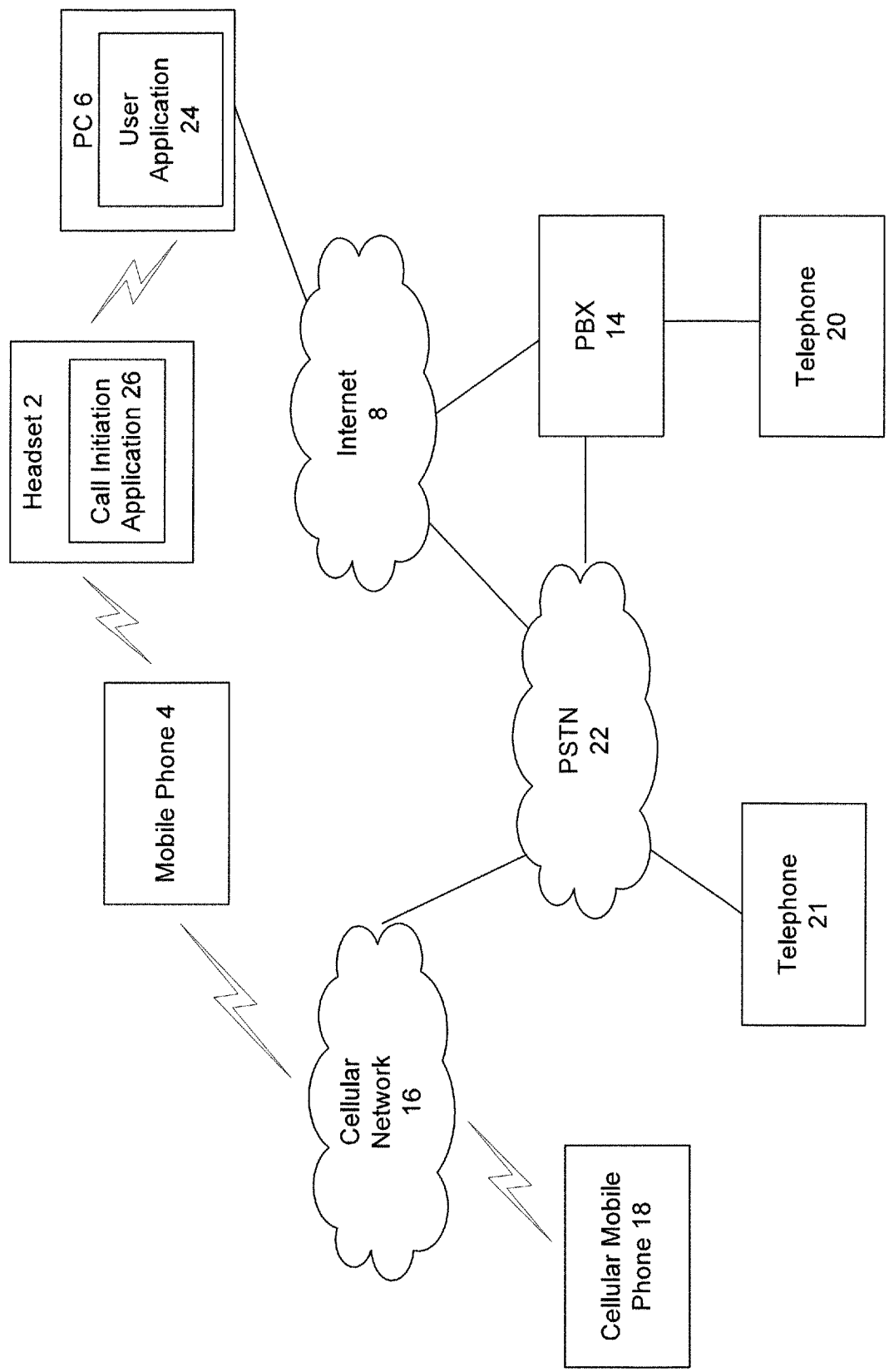
FIG. 1 illustrates a system for initiating a call using a headset in one example.

Methods and apparatuses for initiating telephony calls are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In the prior art, a user at a PC utilizing an application such as an email, customer relations management (CRM), or social software application wishing to transition to voice communications must physically locate and pick up their mobile phone, find the right screen, and click once or twice or three times in order to dial, unless that application is already directly integrated into a back-end voice infrastructure. For example, where a PC user is utilizing an email application and is reading an email and wishes to transition to voice communications with the email sender, the PC user must physically locate their mobile phone and initiate the call. This workflow takes the user out of the context they were in (e.g., the PC based email application). In contrast, the systems and methods described herein advantageously allow the user to stay within the embedded context of their PC based application and to simply click on the mouse they are already using to initiate the call (using the mobile telephony infrastructure) without ever having to physically find or touch their mobile phone.

In one example, a method for initiating a mobile phone call includes receiving a user selection of a desired application item at a computing device and transmitting a dial number associated with the desired application item from the computing device to a wireless headset utilizing a first wireless link. The method includes receiving the dial number at the wireless headset and responsively initiating a call by transmitting the dial number from the wireless headset to a mobile phone device utilizing a second wireless link.

In one example, a method for initiating a mobile phone call utilizing a wireless headset includes receiving a dial number at a wireless headset from a computing device transmitted over a first wireless link, where the dial number is transmitted from the computing device responsive to a user action at the computing device. The wireless headset transmits an outbound call command to a mobile phone device over a second wireless link, where the outbound call command includes the dial number and is configured to initiate a call by the mobile phone device to the dial number.

In one example a system for initiating a mobile phone call includes a computing device, a wireless headset, and a mobile phone device. The computing device is adapted to receive a user selection of a desired application item and transmit an associated dial number over a first wireless link. The wireless headset is adapted to receive the associated dial number from the computing device via the first wireless link and further adapted to initiate an outbound call by transmitting the associated dial number over a second wireless link. The mobile phone device is adapted to receive the associated dial number over the second wireless link, make the outbound call, and conduct the outbound call utilizing the wireless headset.

In one example, a headset that is paired with a mobile phone (e.g., a cell phone) operates as the communications bridge for outbound dialing from a user application running on a PC. In one example, the user application is a business application or any other type of PC user application the user may be using at the PC which is not a standalone telephony application designed to make and receive calls. The user application utilizes a call plug-in applet configured to allow the PC user to click on an inbound communications (or record in a customer relationship management (CRM) or enterprise resource planning (ERP) or other business application) from another person to initiate a call out by the mobile phone. In one example, the plug-in applet is a call initiation application.

In one implementation, the system includes a Bluetooth USB "dongle" plugged into a PC USB port or alternatively, a Bluetooth radio in the PC that can communicate with the headset or other communications device external to the PC itself. The system includes a Bluetooth headset supported by the dongle or having firmware that obviates the need for a dongle. The PC includes a client side application that has some form of contact information that can be correlated to a mobile phone number. This could be an email address or other data.

In operation, the user application running on the PC allows the user to click on a communications from another user, such as an incoming email, to initiate a call back to that person using the mobile phone infrastructure and the connectivity to the mobile phone. Alternately the user application could simply have a person's email or other contact information noted in a record, such as a CRM or ERP application that can be used to link to the person's phone number residing in a contacts database on the PC or on the mobile phone itself.

In one implementation, the PC is running a Unified Communications (UC), CRM, or other business application (such as a resident application or a web browser based application) that utilizes the call initiation application plug-in configured to present the user upon a user action (such as a right click) with the choice of phone numbers to select. Upon selecting a number to call, the system initiates the call through the headset to the mobile phone. Muting or terminating the call is enabled through the headset or via a visual display on the screen that is part of the PC side application. The visual display would also allow for conferencing a $3^{rd}$ party into the call. In a further implementation, the PC is running a UC or business application that does not expose client-side interfaces. The PC is also running a call initiation application that will interface with a corresponding server-side application which in turn communicates with the UC server-side application. In either of these implantation, the PC application (email client, ERP client, the CRM client) must be running and have available interfaces for the call initiation application to integrate with. Additionally, the 'embedded context' will have information available to the call initiation application to deduce/extract dialable telephone numbers or one provided by the user so that the call initiation application will be capable of making an outbound call.

In one system configuration, a wireless headset is paired with a mobile phone. The wireless headset is also paired with a wireless communications dongle on a client PC. The client PC is running a business application(s) that provide(s) interface(s) to extend and extract telephone number information from the context. For instance, interfaces exist to integrate with Microsoft Outlook to extend the options when the user right-clicks on an email. Subsequently, telephone number information can be extracted from the contact information of the email sender. The client PC is running a call initiation add-in to the business application. The client PC is running a UC or a business application that provides interface(s). In addition, the UC or business application will also provide interface(s) for remote call control. The client PC is running the call initiation application that will interface with the UC or business application.

In one method of operation utilizing this system, the wireless headset is paired and within range of both the mobile phone and the PC dongle. The PC business application is running. In an implementation where presence information is reported, a UC client application is also running. The user receives an email and would like to immediately call the sender of the email, or the email/phone number contained in a record for another business application. The user will right click on the said email or record. The user is presented with telephone number options to contact the sender. The user clicks on one of the choices such as "Mobile" or "Office". The call initiation application add-in will initiate an outbound mobile call as follows to the selected phone number.

Using USB/HID (Universal Serial Bus/Human Interface Device) communications, the call initiation application add-in will send an "establish an outbound call" request along with the telephone number to the dongle. Using the ACL channel between the wireless headset and the dongle, the dongle will send an "establish an outbound call" request with a configured AT command along with the telephone number. The wireless headset will react to this command and send a "make call" request using the standard Bluetooth hands free profile (HFP).

The outbound mobile call is established and the wireless headset provides an earcon for this event. Using the ACL channel between the wireless headset and dongle, the wireless headset will send a configured AT command to the dongle. In a presence reporting implementation, the dongle will then translate the command message and inform the call initiation application running on the PC that an outbound mobile call has been established. The call initiation application will then notify the UC presence server that currently the telephony presence state of the user should be altered to "On a Call". The state can be presented either as "Busy" or "Unavailable" if "On a Call" is not one of the supported presence states available on the particular UC application.

When the user terminates the call either by pressing the talk button on the wireless headset or "End" on the mobile phone, using ACL channel between the wireless headset and dongle, the wireless headset sends a configured AT command to the dongle notifying the dongle that the call on the mobile phone has been terminated. The dongle then translates this message and relays it to the call initiation application running on the PC. The call initiation application will then change the telephony presence state of the user to "Available".

If the user desires to mute the call once initiated, then the user can push the mute button on the headset or a mute soft button provided by the call initiation application. If the user desires to create a 3 way conference call, after selecting the first number to be dialed and connected, the user can select another person from within their email application (particularly if there are multiple people included in the email communication). This would add the second person to the call after the call was initiated with the first person by dialing the second person in a manner similar to the first person and connecting the calls.

FIG. 1 illustrates a system for initiating a call using a headset in one example. The system includes a headset 2 operating in multipoint mode paired with both a mobile phone 4 and a computing device such as a personal computer (PC) 6 executing a user application 24. User application 24 may be any type of application running on a computer. In one example, user application 24 is not a dedicated telephony application such as a VoIP telephone, but a business related application or other user application such as Microsoft Outlook that includes email, contacts, and calendaring functionality.

Personal computer 6 may, for example, be a notebook computer, desktop computer, or PDA type device. Mobile phone 4 is in wireless communication with cellular network 16, and can make outgoing calls via the cellular network 16. Mobile phone 4 may receive incoming calls from the public switched telephone network (PSTN) 22 through cellular network 16. A call initiation application 26 residing on headset 2 provides for seamless initiation of a call using mobile phone 4 following a user action at user application 24 on PC 6.

Figure 2:
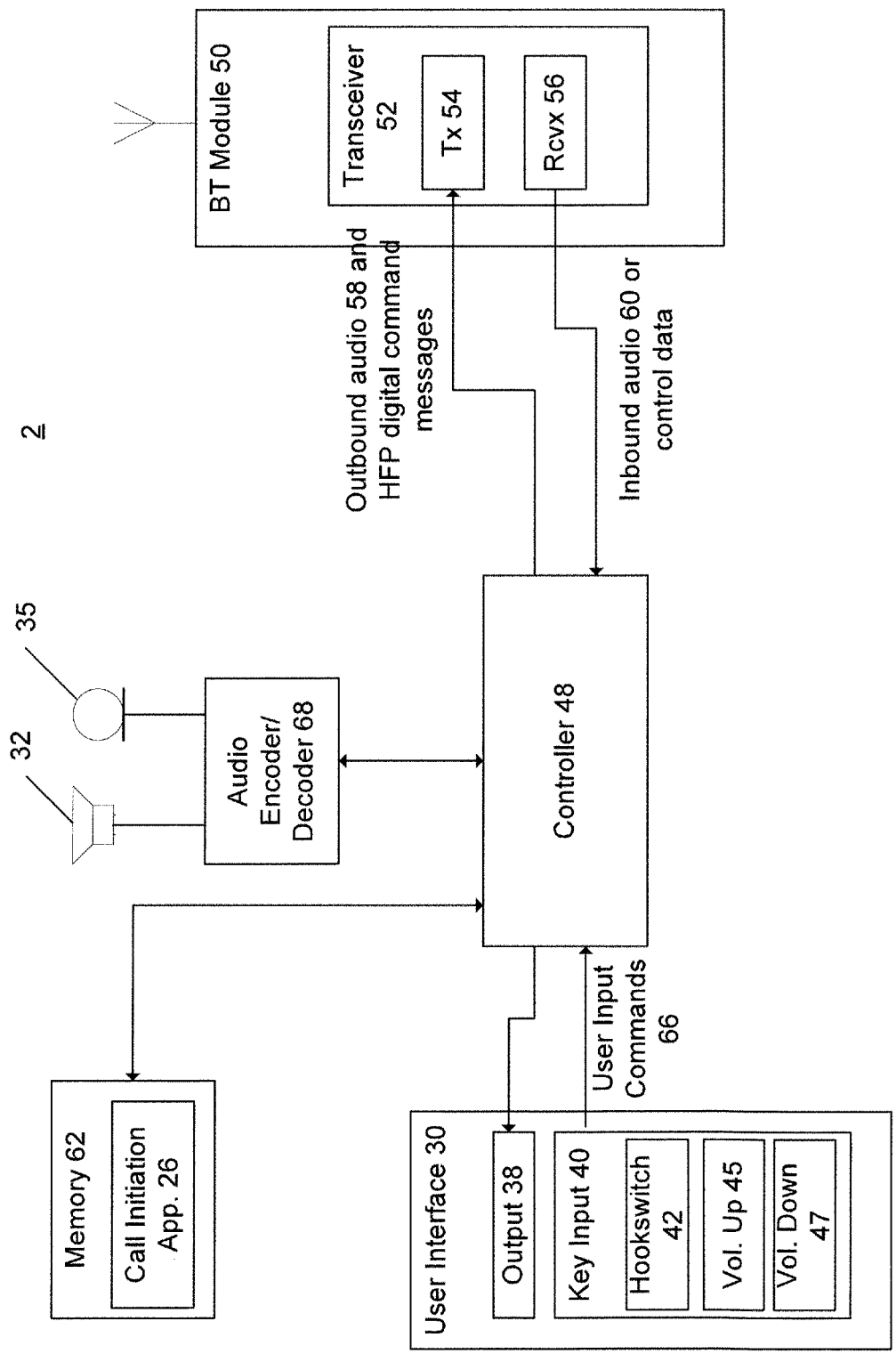
FIG. 2 illustrates a simplified block diagram of the headset shown in FIG. 1 where the headset utilizes Bluetooth.

FIG. 2 illustrates a simplified block diagram of the headset shown in FIG. 1 where the headset 2 utilizes the Bluetooth protocol. In further examples, other wireless protocols may be utilized, such as IEEE 802.11 or digital enhanced cordless telecommunications (DECT). For clarity, not all components of the headset 2 are illustrated. The headset 2 includes a Bluetooth module 50, an audio encoder/decoder 68, memory 62, controller 48, user interface 30, speaker 32, and microphone 35. Controller 48 may include a variety of processors, such as digital signal processors.

User interface 30 includes a key input 40. Key input 40 includes a hookswitch function 42, volume up input 45 and volume down input 47. The user interface 30 may also include one or more output interfaces 38 typical to headsets, such as LED indicators or some form of a display. The speaker 32 may also be used as an interface output.

Bluetooth module 50 includes a transceiver 52 having a transmitter 54 and a receiver 56. In the present example, Bluetooth module 50 receives and transmits a wireless signal utilizing the Bluetooth protocol Hands-Free Profile. The wireless signal transmitted by transmitter 54 includes outbound audio 58 and Hands-Free Profile command messages received from controller 48. Inbound audio 60 and control data is received by receiver 56 and sent to controller 48. Audio encoder/decoder 68 is used for processing a digital audio signal and an analog audio signal as known in the art.

The Bluetooth transceiver 52 is operable to simultaneously form Bluetooth ACL and SCO links with PC 6 and mobile phone 4. Controller 48 is operable to receive user input commands 130 from user interface 30 and convert these commands to Hands-Free Profile digital command messages. In one example, controller 48 is part of a Bluetooth chip set. These Hands-Free Profile digital command messages are sent to Bluetooth module 50 for wireless transmission using Bluetooth module 50. Controller 48 also receives inbound audio or audio files for output by speaker 32 following decoding by audio encoder/decoder 68. User interface 30 can be any combinations of visual interfaces, tactile interfaces, and/or an audio interface that allow the user to input commands.

Memory 62 stores a call initiation application 26 executed by controller 48 to perform call initiation functions as described herein. Such call initiation functions may be initiated by the user at PC 6. In one example, the call initiation application 26 enables the headset 2 to switch to enter a call initiation mode, where during the call initiation mode the headset 2 is configured to receive a transmitted dial number responsive to an input action at a PC from a headset user. Following receipt of the dial number, the headset 2 transmits an initiate/make call command to the mobile phone 4 including the dial number. Memory 62 is also used to store digital data, and can take a variety of well known forms, such as flash memory or memory integrated with controller 48.

In operation, referring to FIG. 1 and FIG. 2 together, a PC user at user application 24 may initiate a call to a desired contact at a cellular mobile phone 18 via cellular network 16, telephone 21 via PSTN 22, or telephone 20 via PBX 14. Alternatively, the user may conduct a call with several participants simultaneously, as in the case of a conference call.

In order to initiate the call, in one example, a user selection of a desired application item is received at a user application 24 running on PC 6. A dial number associated with the desired application item is transmitted from the PC 6 to the wireless headset 2 utilizing a wireless link. The dial number is received at the wireless headset 2 and a call is initiated by transmitting the dial number from the wireless headset 2 to the mobile phone 4 utilizing a wireless link.

In one example, receiving a user selection of a desired application item at the PC 6 includes receiving the user selection within a non-telephony user application running on the PC 6. For example, the non-telephony user application may be an email application and the user selection includes selecting a received email if the user wishes to dial the sender of the received email.

In one example, receiving a user selection of a desired application item includes receiving a first user selection of a displayed application item associated with a desired contact entity. One or more contact numbers associated with the desired contact entity are retrieved and displayed to the user. For example, the displayed application item is an email and retrieving one or more contact numbers includes retrieving data from a contacts folder. The user then selects the desired contact number from the displayed choices. For example, several potential phone numbers are retrieved from the contacts folder corresponding to the sender of the selected received email.

Figure 11:
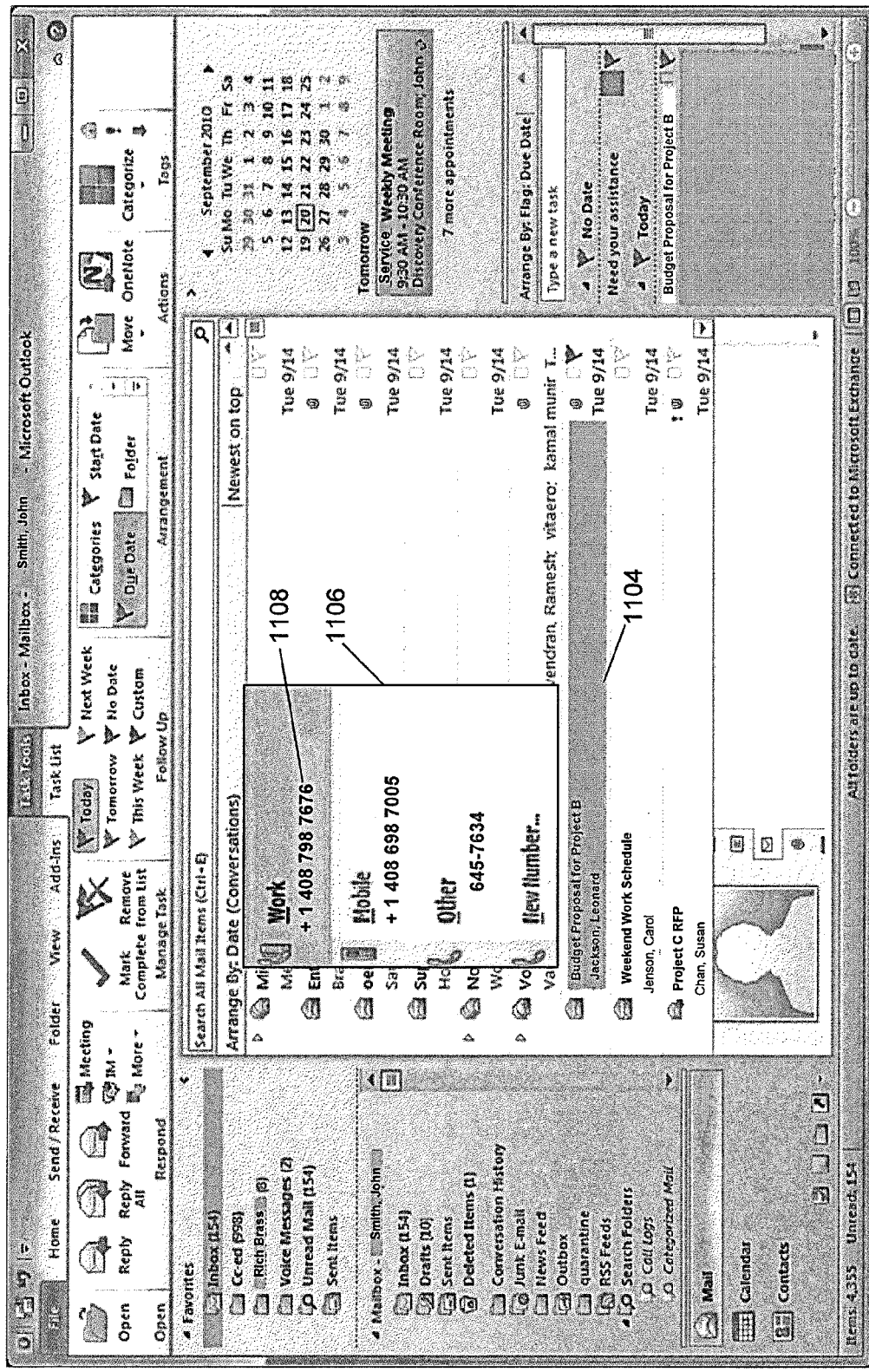
FIG. 11 is an illustration of a non-telephony user application from which a user selects an item to initiate a call in one example.

FIG. 11 is an illustration of a screenshot 1102 of a user application 24 from which a user selects an item to initiate a call in one example. Shown in screenshot 1102, the user has right-clicked on an email 1104 from "Jackson, Leonard" and as such the call initiation application add-in will have presented the user with all the phone numbers 1106 that it could extract from the particular contact "Jackson, Leonard". Upon clicking on the desired number (e.g., the highlighted "Work" telephone number 1108), the call initiation application will initiate an outbound call through the headset (which is paired to the user's mobile phone) using the user's mobile phone. Additionally, once the outbound call is made, the user's presence may also be updated to reflect the fact that s/he is on a mobile call.

Figure 3:
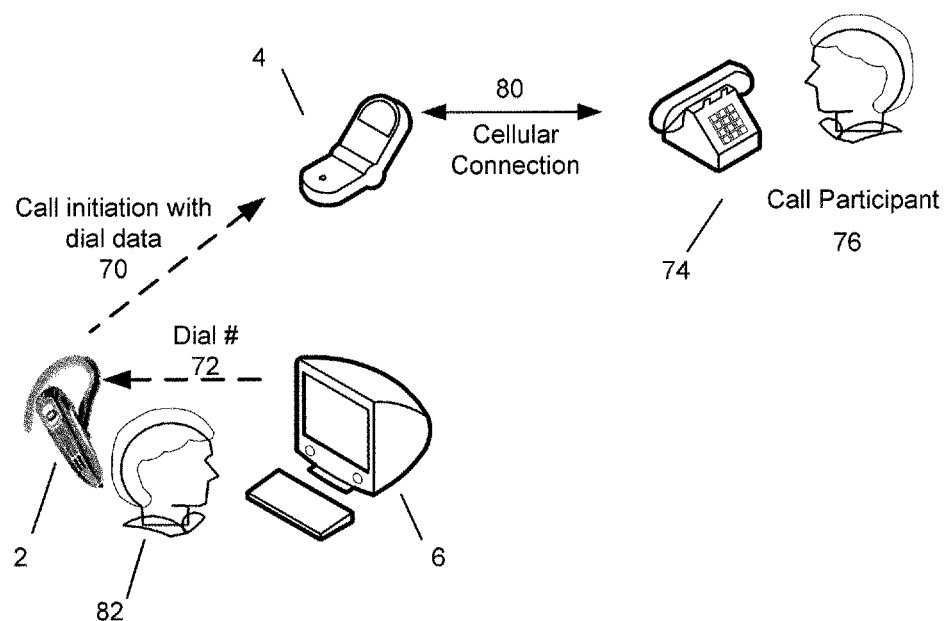
FIG. 3 illustrates the system shown in FIG. 1 in one example usage scenario.

FIG. 3 illustrates the system shown in FIG. 1 in an example usage scenario. In the scenario shown in FIG. 3, a headset wearer 82 using headset 2 is able to form a local wireless link with a mobile phone 4 and a PC 6. The wireless headset 2 is wirelessly paired with the PC 6 and the mobile phone 4 utilizing a wireless communications protocol such as Bluetooth.

The PC 6 is adapted to receive a user selection of a desired application item and transmit an associated dial number 72 over a first wireless link. The wireless headset 2 is adapted to receive the associated dial number 72 from the PC 6 via the first wireless link and further adapted to initiate an outbound call by transmitting a call initiation command with the associated dial number 70 over a second wireless link. The mobile phone 4 is adapted to receive the associated dial number over the second wireless link and make the outbound call over a cellular connection 80. The headset wearer 82 conducts the outbound call utilizing the wireless headset 2 with a call participant 76 at telephone 74.

Figure 4:
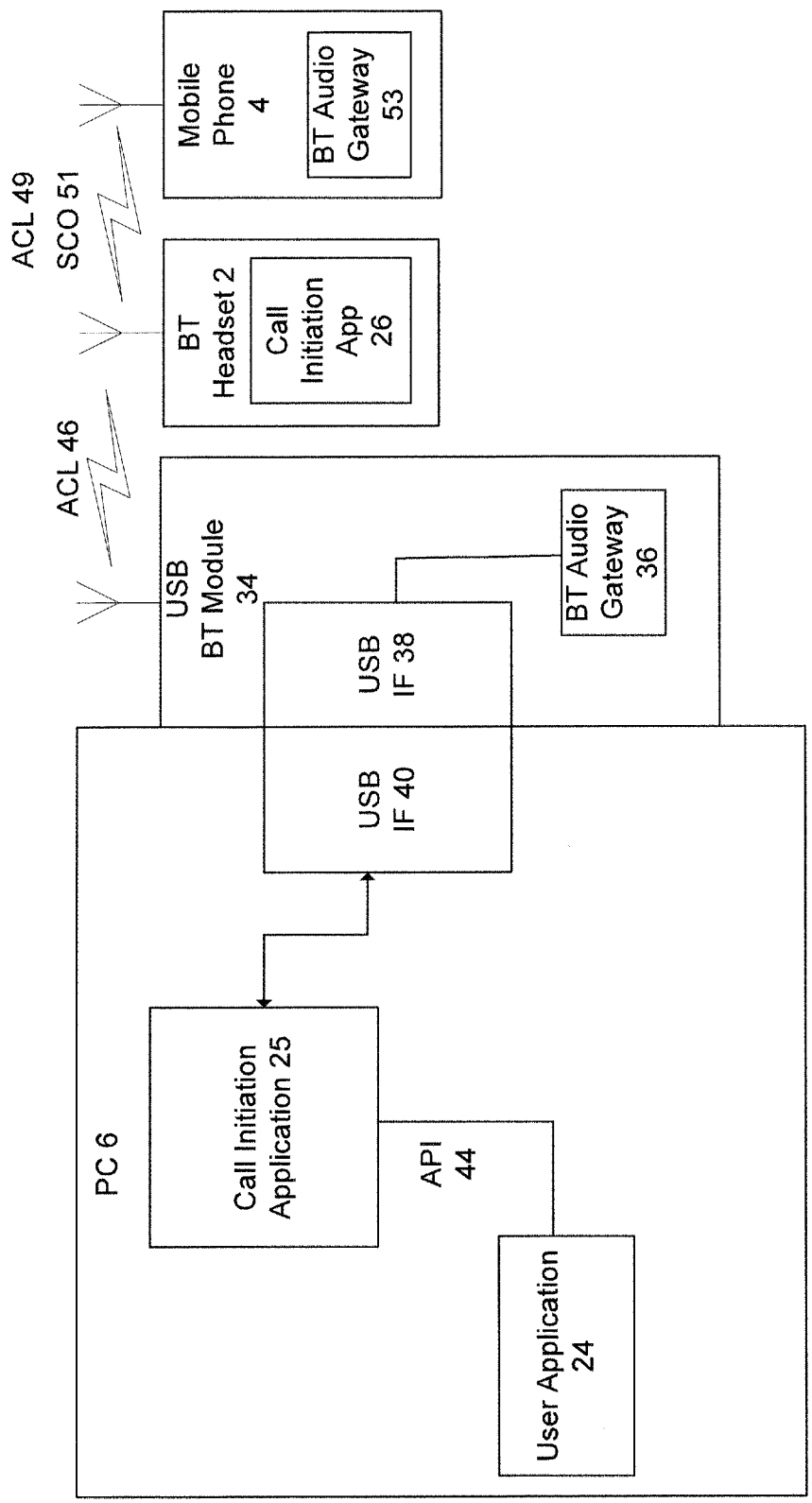
FIG. 4 illustrates a simplified block diagram of select components of the system illustrated in FIG. 1 in one example.

FIG. 4 illustrates a simplified block diagram of select components of the system illustrated in FIG. 1 in one example implementation. In the example shown in FIG. 4, PC 6 includes a USB interface 40, call initiation application 25, and user application 24.

In this example, BT headset 2 is wirelessly connected to a USB Bluetooth module 34 via a Bluetooth link. The devices in FIG. 4 communicate using the Bluetooth Headset Profile in multipoint mode. USB Bluetooth module 34 includes a Bluetooth audio gateway 36 in communication with a USB interface 38. USB interface 38 is inserted into a USB interface 40 of PC 6. PC 6 executes call initiation application 25. The call initiation application 25 operates to handle communication with the USB Bluetooth module 34 through an application programming interface (API) 44 with the associated user application 24 also being executed on computer PC 6. User application 24 may, for example, be any user application from which a user may select an item to initiate a call to a desired individual.

The Bluetooth audio gateway 36 and BT headset 2 provide serial port emulation. The serial port emulation is used to transport user data including AT commands from the BT headset 2 to the Bluetooth audio gateway 36. The AT Commands are parsed by the Bluetooth audio gateway 36. Bluetooth audio gateway 36 receives AT command messages received at USB Bluetooth module 34. In a presence implementation, these AT command messages are vendor specific commands and are translated to corresponding presence information.

BT headset 2 is also wirelessly connected to a mobile phone 4 via a Bluetooth link. When paired and in range, BT headset 2 maintains an ACL link 46 with USB BT module 34 and an ACL link 49 with a mobile phone 4. Mobile phone 4 includes a BT audio gateway 53. Bluetooth audio gateway 53 is the gateway for both input audio and output audio. The BT headset 2 acts as remote audio input and output mechanism for the Bluetooth audio gateway 53. The profile stack for the Headset Profile illustrating the protocols and entities regarding how a headset and audio gateway interact to effect a wireless connection between the devices is known in the art. Mobile phone 4 establishes an active Bluetooth audio SCO link 51 with the BT headset 2.

In one example, USB BT module 34 is a "dongle" attached to a USB port of PC 6 that allows software applications to be used. In this example, the USB BT module 34 runs a Bluetooth stack optimized for audio performance. USB BT module 34 is any base unit, including dongles, operating vendor specific firmware connected to PC 6. The base unit may have the capability to dock a headset for recharging of the headset battery. Alternatively, USB BT module 34 may be integrated with PC 6.

Figure 5:
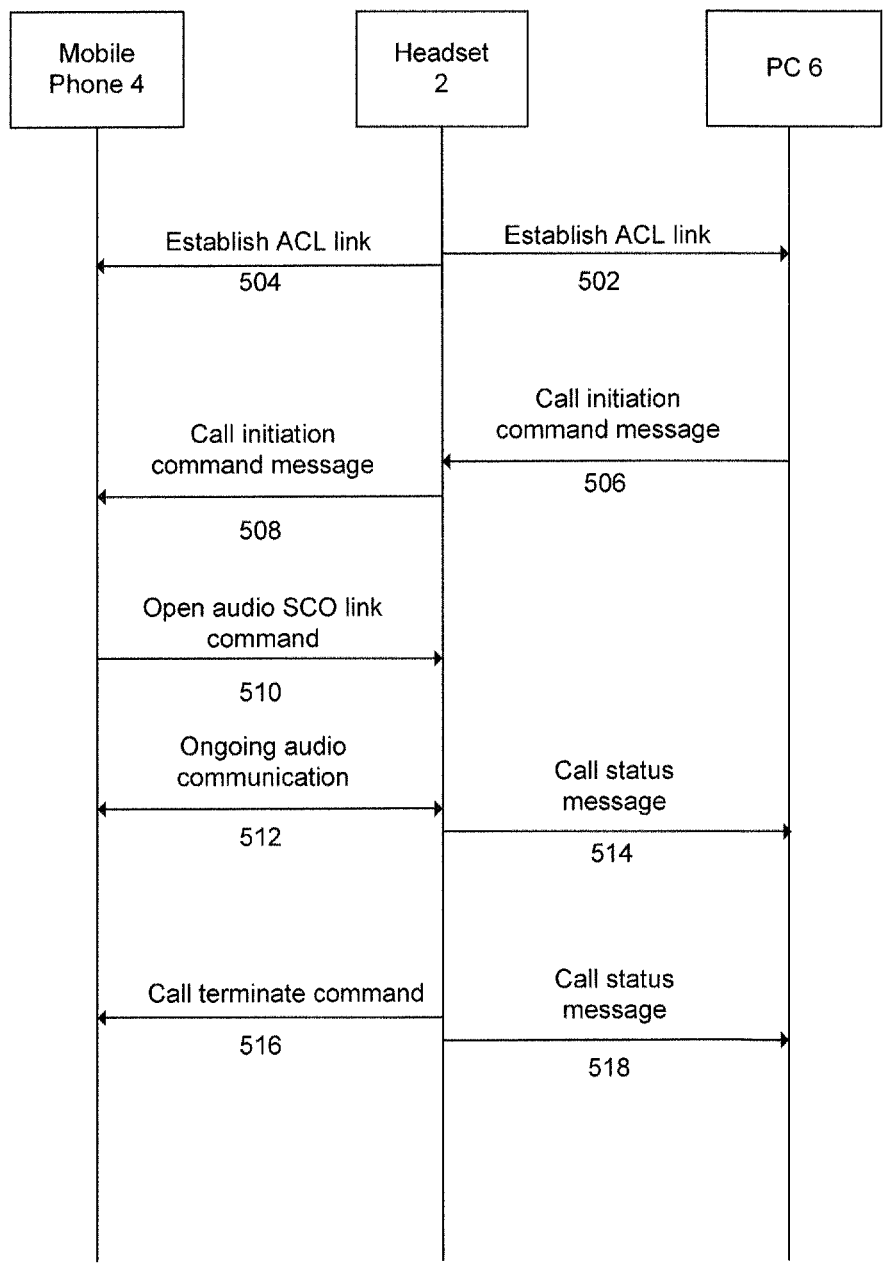
FIG. 5 illustrates initiating a call with a PC and a mobile phone in a Bluetooth implementation example.

FIG. 5 illustrates initiating a call to a mobile phone 4 in a Bluetooth headset implementation example. At step 502, the headset 2 initiates connection establishment with a PC 6 to form an ACL link. At step 504, the headset 2 initiates connection establishment with a mobile phone 4 to form an ACL link. Both the ACL link with the PC 6 and the mobile phone 4 are simultaneously active.

When the user wishes to initiate a call, the user initiates a make call action at PC 6. At step 506, the PC 6 issues a call initiation command message to headset 2 instructing headset 2 to initiate a call. The call initiation message sent from the PC 6 to the headset 2 instructing the headset 2 to enter call initiation mode is sent over the ACL link. At step 508, the headset 2 issues a call initiation command message to mobile phone 4. At step 510 the mobile phone 4 issues an open audio SCO link command to the headset 2.

In one example, the headset 2 initiates outgoing voice calls by transmitting the dial number (i.e. destination phone number) to the audio gateway at the mobile phone 4. To begin the call set up, headset 2 initiates a Service Level Connection establishment between the headset and the mobile phone 4 and sends a proper ATDdd . . . dd command to the mobile phone 4. The mobile phone 4 then begins the call establishment procedure using the dial number received from headset 2 and issues a +CIEV result code with a value (callsetup=2) to notify the headset 2 that the call set-up has been successfully initiated.

If an audio connection is not already established, the mobile phone 4 establishes the proper audio connection and routes the audio paths of the outgoing call to the headset 2 immediately after commencement of the ongoing call set up procedure. Following call connection, the mobile phone 4 issues a +CIEV result code with a value indicating (call=1).

At step 512, ongoing audio communication over the open SCO link occurs between mobile phone 4 and headset 2. At step 514, headset 2 issues a call status message to PC 6 indicating a call is ongoing using mobile phone 4. At step 516, headset 2 sends a call terminate command to the mobile phone 4 over the SCO link with the mobile phone 4 responsive to a user call termination action. The mobile phone 4 then terminates the SCO link between the mobile phone 4 and the headset 2. At step 518, headset 2 issues a call status message to PC 6 indicating the call has been terminated.

Figure 6A:
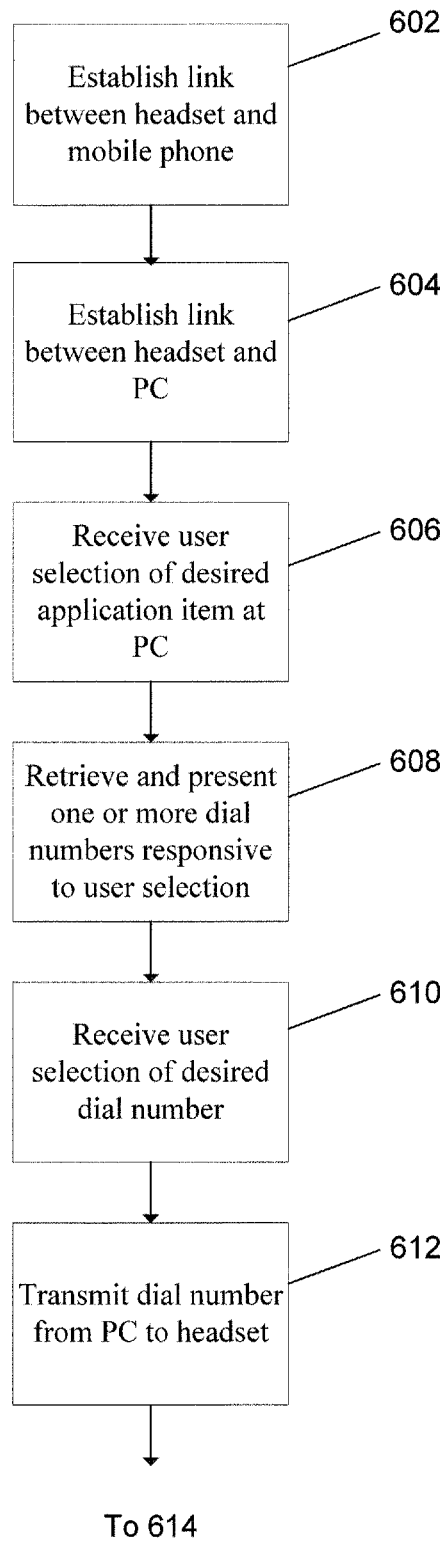
FIGS. 6A-6B are a flow diagram illustrating a call initiation process using a PC and a headset in one example.
Figure 6B:
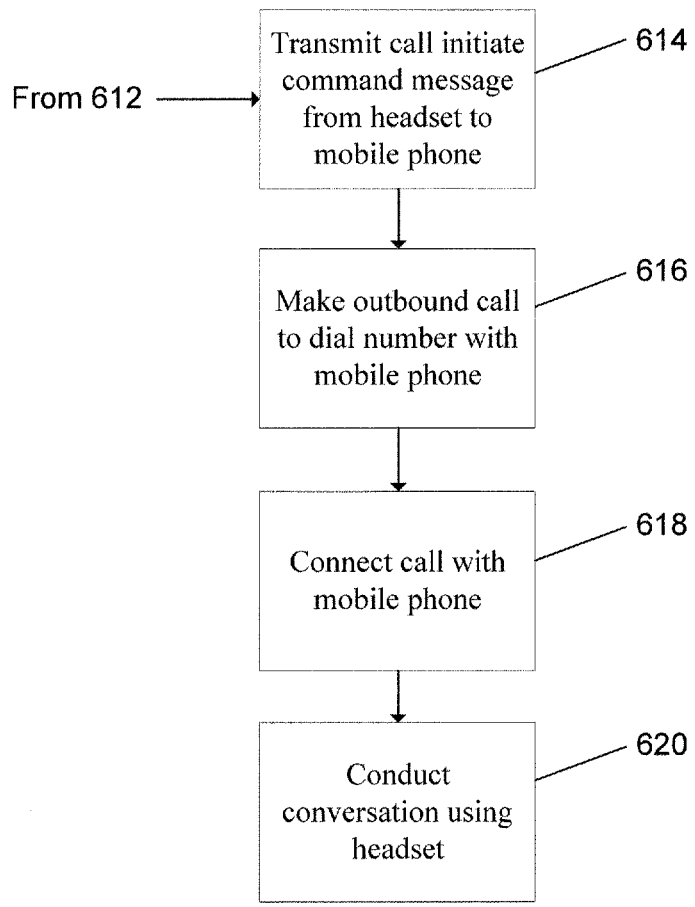

FIGS. 6A-6B are a flow diagram illustrating a call initiation process using a headset in one example. At block 602, a link is established between a headset and a mobile phone. At block 604, a link is established between the headset and a PC. At block 606, a user selection of a desired application item is received at the PC. At block 608, one or more dial numbers are retrieved and presented to the user responsive to the user selection of the desired application item. At block 610, the user selection of the desired dial number is received.

At block 612, the selected dial number is transmitted from the PC to the headset in a make call command. At block 614, the headset transmits a call initiate command message to the mobile phone. At block 616, an outbound call is made by the mobile phone to the dial number. At block 618, the mobile phone connects the outgoing call. At block 620, conversation is conducted using the headset.

Figure 7:
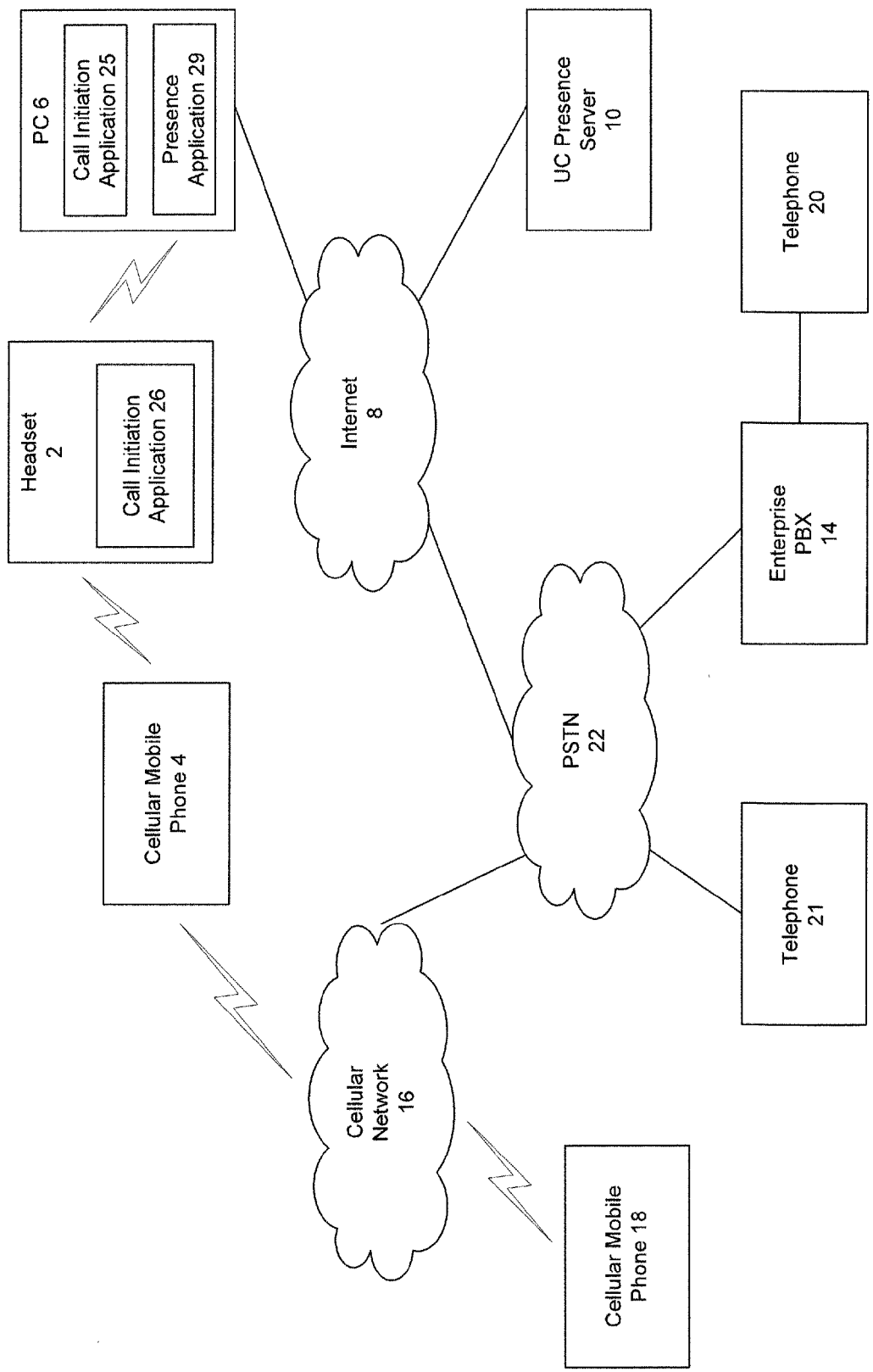
FIG. 7 illustrates a system for reporting mobile telephony presence in one example.

FIG. 7 illustrates a further example of the system shown in FIG. 1 in which mobile telephony presence is reported. In this example, presence related information is reported in a Unified Communications system. Once an audio communication channel is established between the wireless headset and the mobile phone device, messaging data indicating the user has established the audio communication channel is transmitted from the wireless headset to the PC. This call status message is configured to be utilized by the PC to report an associated presence state. An associated presence state is transmitted by the PC to a presence server. For example, the associated presence state is on-a-mobile-phone-call, on-a-call, busy, unavailable, or similar indication. Establishing an audio communication channel between the mobile phone device and the wireless headset may include either conducting a mobile phone call or initiating an outgoing call from the mobile phone.

Presence information is also reported when the user becomes "available". Once the audio communication channel between the mobile phone device and the wireless headset is terminated (e.g., because the user hangs up the call), messaging indicating the user has terminated a call is transmitted from the wireless headset to the PC. The PC translates the messaging to a presence state indicating the user is available, and reports the presence state to the presence server. In one example, the call status messaging is dependent upon an audio communication channel status between the wireless headset and the mobile phone.

In the system shown in FIG. 7, PC 6 transmits and receives presence information to and from a unified communications (UC) presence server 10 in a client-server relationship. PC 6 includes a presence application 29. In the example shown in FIG. 7, data is transmitted between PC 6 and UC presence server 10 via Internet 8.

The PC 6 is paired with the BT headset 2 and in communication with a UC presence server 10. In a Bluetooth implementation, PC 6 receives over a Bluetooth ACL link 46 an AT command message indicating a call has been established or terminated between headset 2 and cellular mobile phone 4. The presence application 29 translates the AT command message to an associated presence state, and send the associated presence state to UC presence server 10, which in turn may modify the user presence state at the UC presence server 10.

Figure 8A:
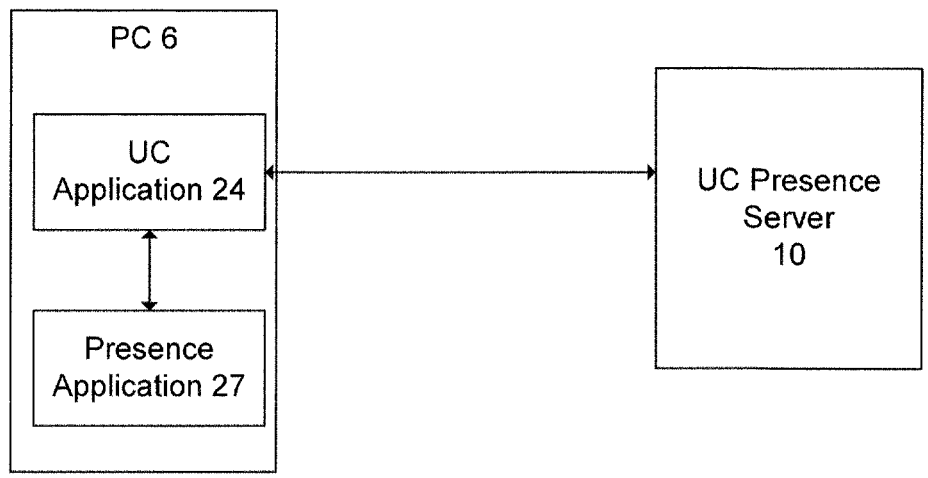
FIG. 8A illustrates one example configuration for reporting presence information from a presence application to a unified communications presence server.

Referring to FIG. 8A, a simplified block diagram of PC 6 in one example is illustrated. PC 6 includes a presence application 29 interfacing with a client-side UC application 27 having exposed client-side interfaces. FIG. 8A illustrates one example configuration for reporting presence information from the presence application 29 to the unified communications presence server 10 via the UC application 27. UC application 27 accepts presence state changes from presence application 29, and reports the presence state to UC presence server 10. In further example, presence application 29 and client-side UC application 27 may be integrated into a single presence application. Client-side UC application 27 transmits and receives presence data to and from UC presence server 10, providing an interface to alter the presence state of the user as described herein. In addition, the UC application 27 may also provide interface(s) for remote call control.

Client-side UC application 27 may, for example, be a commercial presence UC application such as IBM Lotus Sametime 8.0, Microsoft Office Communicator running in conjunction with Office Communications Services 2007, or other similar UC application. UC presence server 10 may, for example, be an IBM Lotus Sametime Server where the client-side UC application 27 is also IBM Lotus Sametime. Presence application 29 operates to output the user presence state.

Figure 8B:
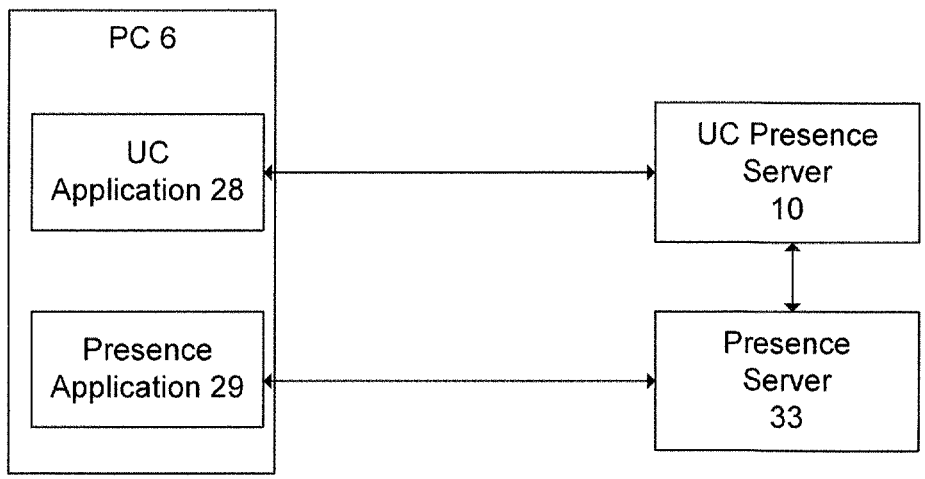
FIG. 8B illustrates a further example configuration for reporting presence information from a presence application to a unified communications presence server.

Referring to FIG. 8B, a simplified block diagram of PC 6 in a further example is illustrated. FIG. 8B illustrates a further example configuration for reporting presence information from a presence application 29 to a unified communications presence server 10. In the example shown in FIG. 8B, PC 6 includes a presence application 29 and a UC application 28. In this example, UC application 28 does not expose client-side interfaces and presence application 29 cannot alter the user's presence state. The UC application 28 will only accept presence state changes from the UC presence server 10. Presence application 29 interfaces with a server-side presence application running on a presence server 33, which in turn communicates with a UC server-side application running on UC presence server 10. The presence application 29 reports presence information such as the user presence state to presence server 33, which in turn reports the presence information to UC presence server 10.

Figure 9:
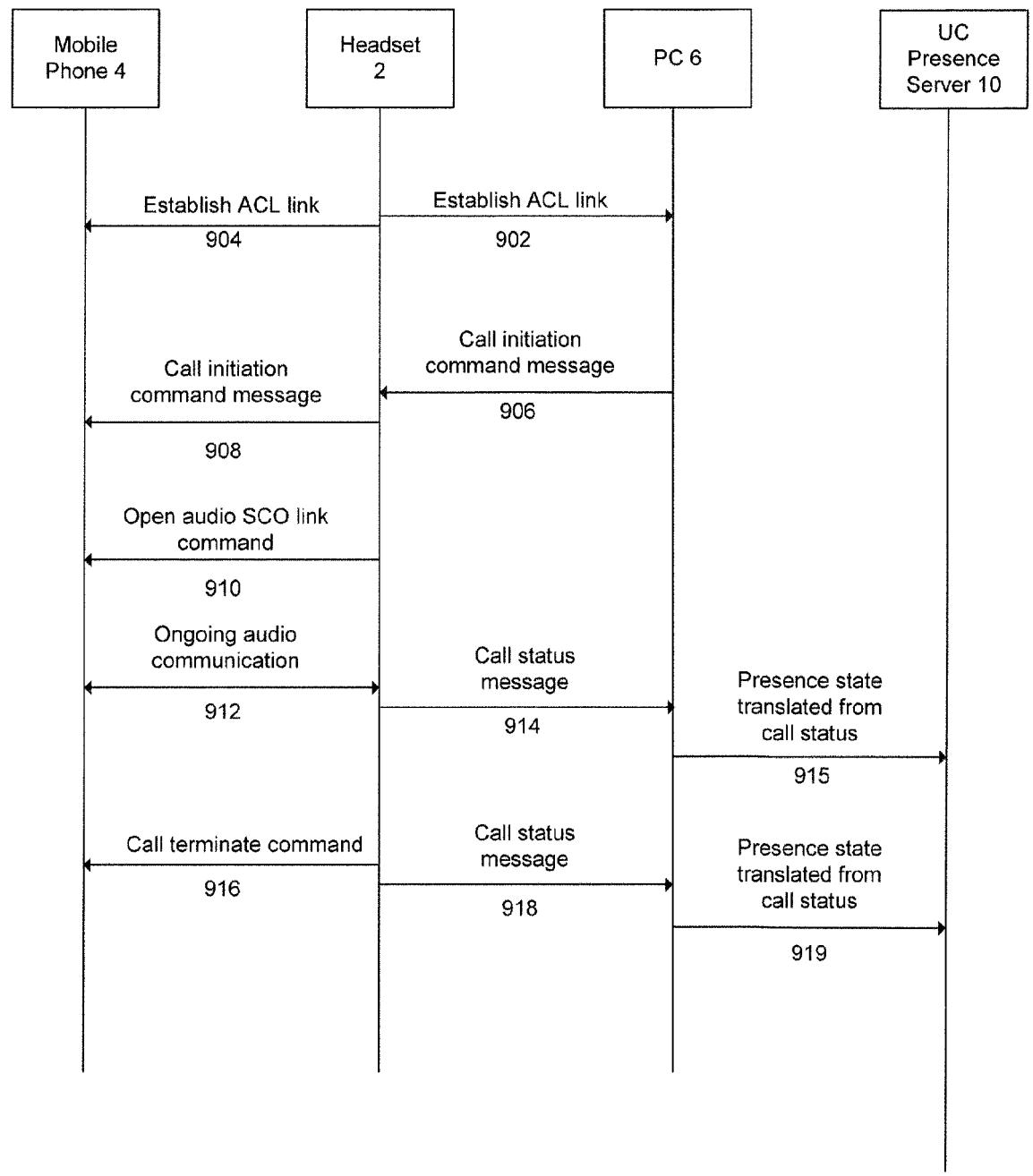
FIG. 9 illustrates reporting of mobile telephony presence data in one example.

FIG. 9 illustrates reporting of mobile telephony presence data from a BT headset 2 to a UC presence server 10 via PC 6 in the system, shown in FIG. 7, whereby presence data is updated based upon whether an active audio channel is open between the BT headset 2 and a mobile phone 4. BT headset 2 and the mobile phone 4 are paired and connected, and the BT headset 2 and the PC 6 are paired and connected.

At step 902, the headset 2 initiates connection establishment with a PC 6 to form an ACL link. At step 904, the headset 2 initiates connection establishment with a mobile phone 4 to form an ACL link. Both the ACL link with the PC 6 and the mobile phone 4 are simultaneously active.

When the user wishes to initiate a call, the user initiates a make call action at PC 6. At step 906, the PC 6 issues a call initiation command message 906 to headset 2 instructing headset 2 to initiate a call. The call initiation message sent from the PC 6 to the headset 2 instructing the headset 2 to enter call initiation mode is sent over the ACL link. At step 908, the headset 2 issues a call initiation command message to mobile phone 4.

At step 910 the headset 2 issues an open audio SCO link command to the mobile phone 4. At step 912, ongoing audio communication, over the open SCO link occurs between mobile phone 4 and headset 2.

At step 914, headset 2 issues a call status message to PC 6 indicating a call is ongoing using mobile phone 4. For example, call status message is an AT command message to PC 6 using the ACL link indicating that an audio SCO link has been opened between the mobile phone 4 and BT headset 2. The AT command message content may be vendor specific, and may indicate that an audio SCO link is open or simply that the user is busy or unavailable. For example, the presence state is reported as "on-a-mobile-phone-call". In further examples, the presence state may be reported on a more generic level, such as "on-a-call" or equivalent language, or even more simply as "unavailable" or "busy".

The AT command message is translated to a presence state by the presence application running on PC 6. At step 915, the presence state translated from the AT command message is sent from the PC 6 to a UC presence server 10. For example, where the SCO link has been opened, the reported presence state may be on-a-mobile phone call, on-a-call, busy, or other similar state indicating the user is unavailable. The path with which the UC presence server 10 receives the presence state may vary depending on the particular system architecture, as described above in reference to FIGS. 8A and 8B. At step 912, ongoing audio communication over the open SCO link occurs between mobile phone 4 and BT headset 2 once the audio SCO link is opened.

At step 916, headset 2 sends a call terminate command to the mobile phone 4 over the SCO link with the mobile phone 4 responsive to a user call termination action. The mobile phone 4 then terminates the SCO link between the mobile phone 4 and the headset 2.

At step 918, headset 2 issues a call status message to PC 6 indicating the call has been terminated. For example, the call status message is an AT command message to PC 6 over the ACL link indicating that the audio SCO link has been terminated between mobile phone 4 and BT headset 2. This AT command message is translated to a presence state by the presence application at PC 6. At step 919, the presence state translated from the AT command message is sent from the PC 6 to the UC presence server 10. The presence state reported may be varied depending on the particular presence system implementation. In one example, once the ongoing call with the mobile phone is terminated, the user presence state is reported as "available".

Figure 10A:
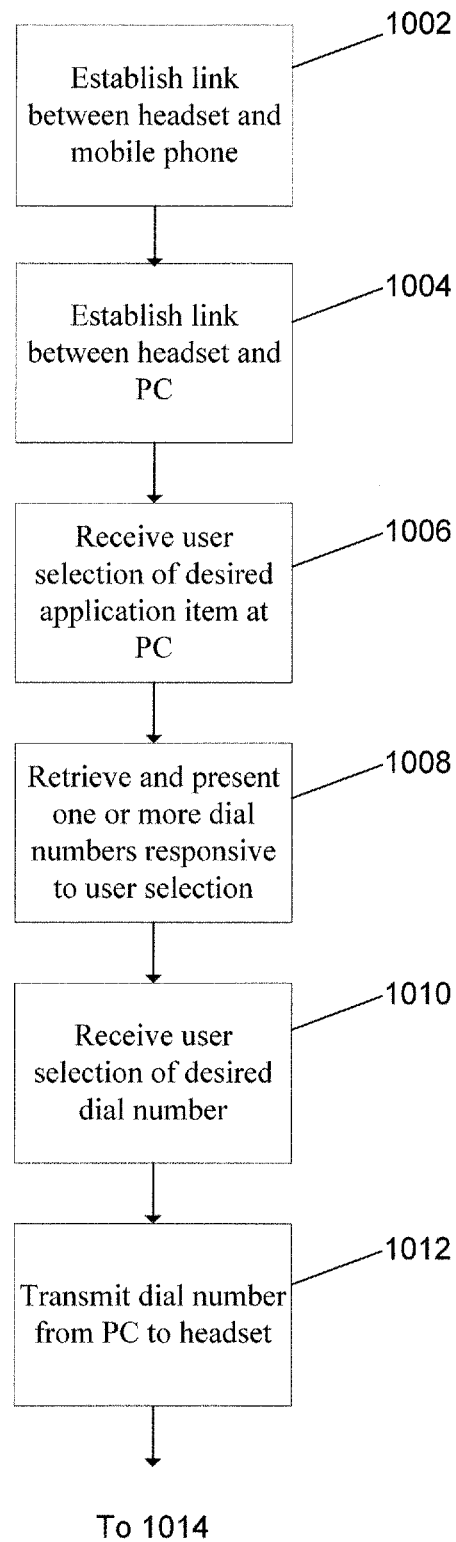
FIGS. 10A-10C are a flow diagram illustrating reporting of mobile telephony presence in one example.
Figure 10B:
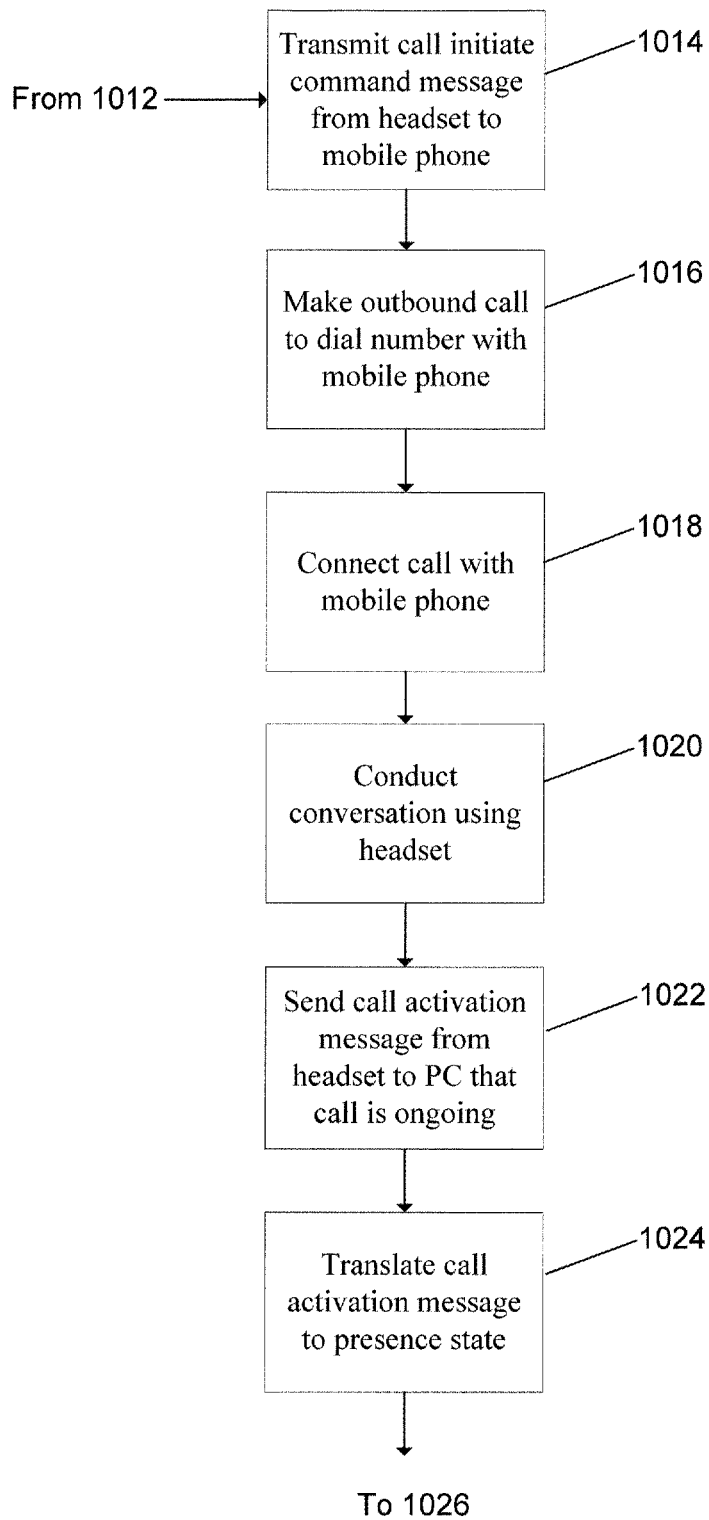
Figure 10C:
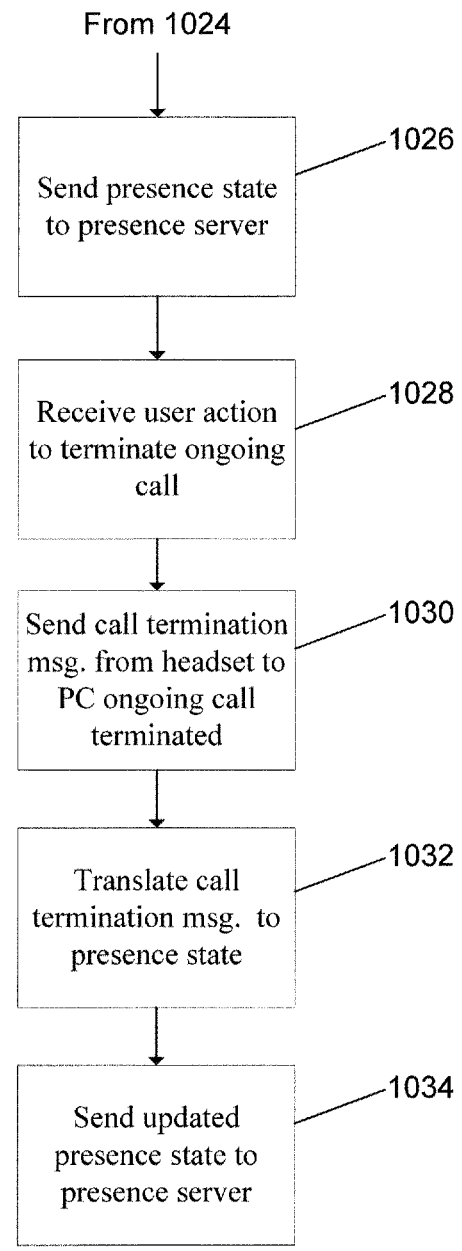

FIGS. 10A and 10B are a flow diagram illustrating reporting of cellular mobile telephony presence in the system shown in FIG. 7 in one example. At block 1002, a link is established between a headset and a mobile phone. At block 1004, a link is established between the headset and a PC. At block 1006, a user selection of a desired application item is received at the PC. At block 1008, one or more dial numbers are retrieved and presented to the user responsive to the user selection of the desired application item.

At block 1010, the user selection of the desired dial number is received. At block 1012, the selected dial number is transmitted from the PC to the headset in a make call command. At block 1014, the headset transmits a call initiate command message to the mobile phone. At block 1016, an outbound call is made by the mobile phone to the dial number. At block 1018, the mobile phone connects the outgoing call. At block 1020, conversation is conducted using the headset. At block 1022, a call activation message is sent from the headset to the PC that the outgoing call has been connected and is ongoing.

At block 1024, the call activation message is translated at the PC to an associated presence state. At block 1026, the presence state is sent to a presence server. The specific presence state reported may be varied depending on the particular presence system implementation. In one example, the presence state is reported as "on-a-mobile-phone-call". In further examples, the presence state may be reported on a more generic level, such as "on-a-call" or equivalent language, or even more simply as "unavailable" or "busy". Additional presence information may also be reported to the UC presence server. Methods and systems for headset derived presence are discussed in co-pending and commonly assigned U.S. patent application Ser. No. 11/697,087 for "Headset-Derived Real-Time Presence and Communication Systems and Methods" filed on Apr. 5, 2007, and U.S. patent application Ser. No. 12/136,335 for "Mobile Telephony Presence" filed on Jun. 10, 2008, which are hereby incorporated by reference in their entirety for all purposes.

At block 1028, a user action to terminate an ongoing call is received. For example, the user may push the headset talk button or press the end button on the mobile phone. At block 1030, a call termination message is sent from the headset to the PC that an ongoing call has been terminated. At block 1032, the call termination message is translated to an associated presence state. At block 1034, the updated presence state is sent to the presence server. The presence state reported at block 1034 may be varied depending on the particular presence system implementation. In one example, once the ongoing call with the mobile phone is terminated, the user presence state is reported as "available".

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for initiating a mobile phone call comprising:
   receiving a user selection of a desired application item at a computing device;
   transmitting a dial number associated with the desired application item from the computing device to a wireless headset utilizing a first wireless link; and
   receiving the dial number at the wireless headset and responsively initiating a call comprising transmitting the dial number from the wireless headset to a mobile phone device utilizing a second wireless link.

2. The method of claim 1, wherein receiving a user selection of a desired application item at a computing device comprises receiving the user selection within a user application running on the computing device.

3. The method of claim 2, wherein the user application comprises an email application and the user selection comprises selecting a received email.

4. The method of claim 1, wherein receiving a user selection of a desired application item comprises:
   receiving a first user selection of a displayed application item associated with a desired contact entity;
   retrieving and displaying one or more contact numbers associated with the desired contact entity; and
   receiving a second user selection of a desired contact number.

5. The method of claim 4, wherein the displayed application item is an email and retrieving one or more contact numbers comprises retrieving data from a contacts folder.

6. The method of claim 1, further comprising:
   establishing an audio communication channel between the wireless headset and the mobile phone device;
   transmitting from the wireless headset to the computing device over the first wireless link messaging data indicating the user has established the audio communication channel; and
   reporting an associated presence state to a presence server utilizing the computing device.

7. The method of claim 6, wherein the associated presence state is on-a-mobile-phone-call, on-a-call, busy, or unavailable.

8. The method of claim 6, wherein establishing an audio communication channel between the mobile phone device and the wireless headset comprises conducting a mobile phone call.

9. The method of claim 6, wherein establishing an audio communication channel between the mobile phone device and the wireless headset comprises initiating an outgoing call from the mobile phone device.

10. The method of claim 6 further comprising:
    terminating the audio communication channel between the mobile phone device and the wireless headset;
    transmitting from the wireless headset to the computing device messaging indicating the user has terminated a call;
    translating the messaging to a presence state indicating the user is available; and
    reporting the presence state indicating the user is available to the presence server.

11. A method for initiating a mobile phone call utilizing a wireless headset comprising:
    receiving a dial number at a wireless headset from a computing device transmitted over a first wireless link, the dial number transmitted from the computing device responsive to a user action at the computing device; and
    transmitting an outbound call command to a mobile phone device from the wireless headset over a second wireless link, the outbound call command comprising the dial number and configured to initiate a call by the mobile phone device to the dial number.

12. The method of claim 11, where the user action at the computing device comprises selection of a displayed application item associated with a desired contact entity.

13. The method of claim 12, wherein the displayed application item is a received email and the dial number is retrieved from a contacts folder.

14. The method of claim 11, further comprising:
    transmitting a call status message from the wireless headset to the computing device, wherein the call status message is configured to be utilized by the computing device to report an associated presence state.

15. The method of claim 14, wherein the associated presence state is on-a-mobile phone call, busy, or unavailable during a call.

16. The method of claim 14, wherein the associated presence state is available upon termination of a call.

17. The method of claim 14, wherein the call status message is dependent upon an audio communication channel status between the wireless headset and the mobile phone device.

18. A system for initiating a mobile phone call comprising:
- a computing device adapted to receive a user selection of a desired application item and transmit an associated dial number over a first wireless link;
- a wireless headset adapted to receive the associated dial number from the computing device via the first wireless link, the wireless headset further adapted to initiate an outbound call by transmitting the associated dial number over a second wireless link;
- a mobile phone device adapted to receive the associated dial number over the second wireless link, make the outbound call, and conduct the outbound call utilizing the wireless headset.

19. The system of claim 18, wherein receiving a user selection of a desired application item comprises receiving the user selection within a non-telephony application running on the computing device.

20. The system of claim 19, wherein the non-telephony application comprises an email application and the user selection comprises selecting a received email.

21. The system of claim 18, wherein the computing device is further adapted to retrieve one or more dial numbers responsive to the user selection of a desired application item, the computing device further adapted to receive a user selection of a dial number.

22. The system of claim 18, wherein the wireless headset is further adapted to transmit a call status message to the computing device, wherein the computing device is configured to report a user presence state responsive to the call status message.

23. The system of claim 22, wherein the call status message is dependent upon an audio communication channel status between the wireless headset and the mobile phone device.

24. The system of claim 22, wherein the wireless headset is wirelessly paired with the computing device and the mobile phone device utilizing a wireless communications protocol.

25. The system of claim 24, wherein the wireless communications protocol utilizes Bluetooth.

\* \* \* \* \*